United States Patent [19]

Becca

[11] Patent Number: 5,000,467
[45] Date of Patent: Mar. 19, 1991

[54] TRASH CAN CADDY AND METHOD OF USE

[76] Inventor: James R. Becca, 8123 Arrington Ave., Pico Rivera, Calif. 90660

[21] Appl. No.: 408,943

[22] Filed: Sep. 18, 1989

Related U.S. Application Data

[63] Continuation-in-part of Ser. No. 232,274, Aug. 15, 1988, abandoned.

[51] Int. Cl.[5] .............................................. B62B 1/06
[52] U.S. Cl. ................................ 280/47.24; 248/129;
248/907; 280/47.26; 403/118; 403/343
[58] Field of Search ............... 280/47.24, 47.26, 47.29;
248/907, 129; 403/343, 342, 118

[56] References Cited

U.S. PATENT DOCUMENTS

| | | | |
|---|---|---|---|
| D. 184,962 | 4/1959 | Ress | D34/24 |
| 800,445 | 9/1905 | Hourihan | 280/47.24 |
| 1,873,690 | 8/1932 | Ward | 280/47.24 |
| 1,965,944 | 7/1934 | Lea | 280/47.29 |
| 2,040,339 | 5/1936 | Ross | 280/47.26 |
| 2,417,918 | 3/1947 | Fatur | 214/65.4 |
| 2,704,165 | 3/1955 | Hoover | 214/383 |
| 2,764,420 | 9/1956 | Morrissy | 280/47.24 |
| 2,930,561 | 3/1960 | Bittle | 280/47.26 |
| 3,177,000 | 4/1965 | Alexander | 280/36 |
| 3,338,607 | 8/1967 | Broadhurst, Jr. | 403/342 |
| 3,385,334 | 5/1968 | Clay | 403/118 |
| 3,471,163 | 10/1969 | Swara | 280/47.26 |
| 3,598,420 | 8/1971 | Edlin | 280/47.24 |
| 3,845,968 | 11/1974 | Larson | 280/36 C |
| 4,098,416 | 7/1978 | Fawley | 214/380 |

FOREIGN PATENT DOCUMENTS

| | | | |
|---|---|---|---|
| 212708 | 11/1957 | Australia | 403/118 |
| 44557 | 1/1974 | Australia | 280/47.24 |
| 240104 | 10/1987 | European Pat. Off. | 280/47.24 |
| 2610271 | 8/1988 | France | 280/47.24 |
| 613574 | 11/1948 | United Kingdom | 280/47.24 |

Primary Examiner—Andres Kashnikow
Assistant Examiner—Eric Culbreth
Attorney, Agent, or Firm—John S. Christopher

[57] ABSTRACT

A trash can transporting apparatus and method of use having a spring-loaded hook assembly and an upper support bracket, each adjustably secured to a main shaft by a level adjustment lock, the hook assembly including a spring-loaded hook having an upward facing plurality of fingers for grasping a reinforced peripheral rim of a trash can container seated on a stabilizing basket connected to the main shaft while a trash can closure lid is intact, the combination improving the stability and the transporting efficiency of the apparatus. The hook assembly and upper support bracket are adjustable along the vertical dimension of the main shaft for accommodating various sized household plastic trash can containers. When not in use, the apparatus can be displayed, shipped, stored, or transported by disassembling the various components including the main shaft, each comprised of a high-strength plastic.

29 Claims, 9 Drawing Sheets

FIG. 2
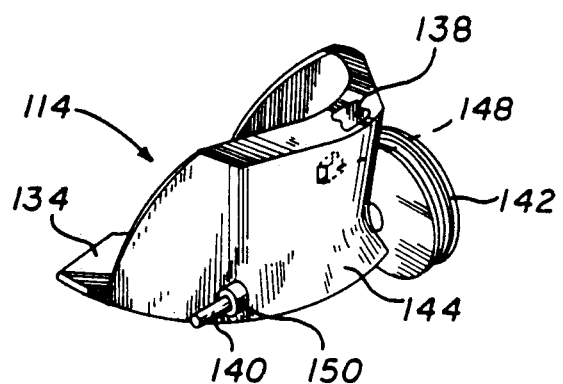
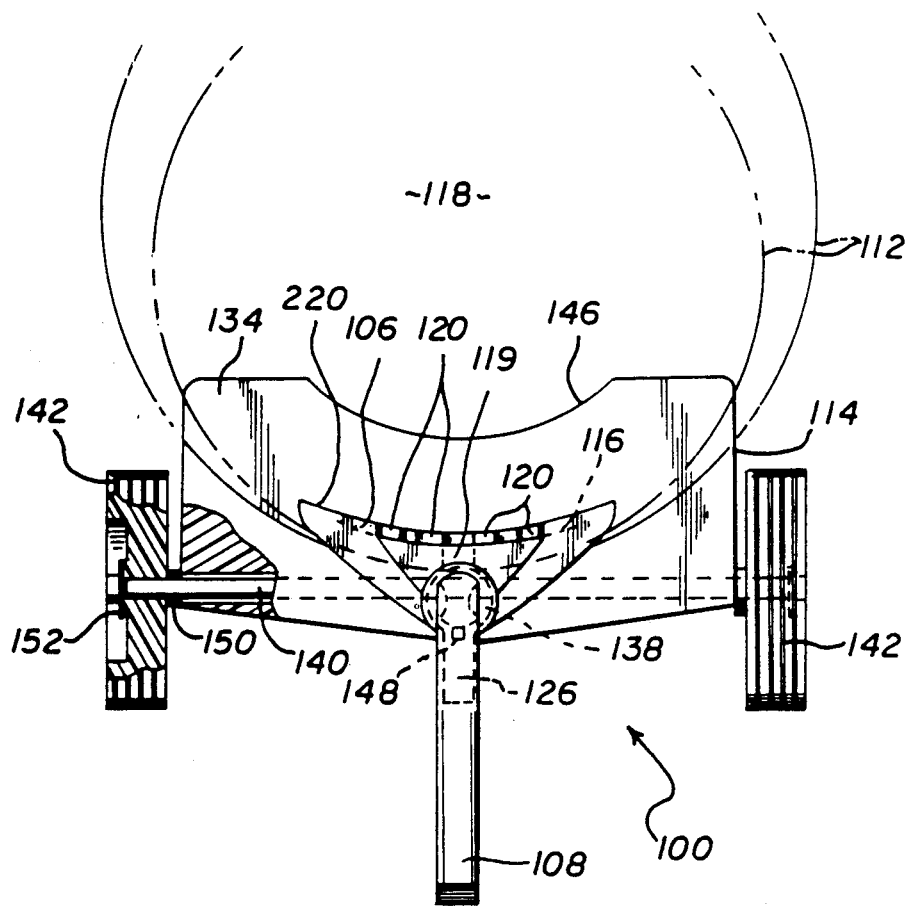
FIG. 3

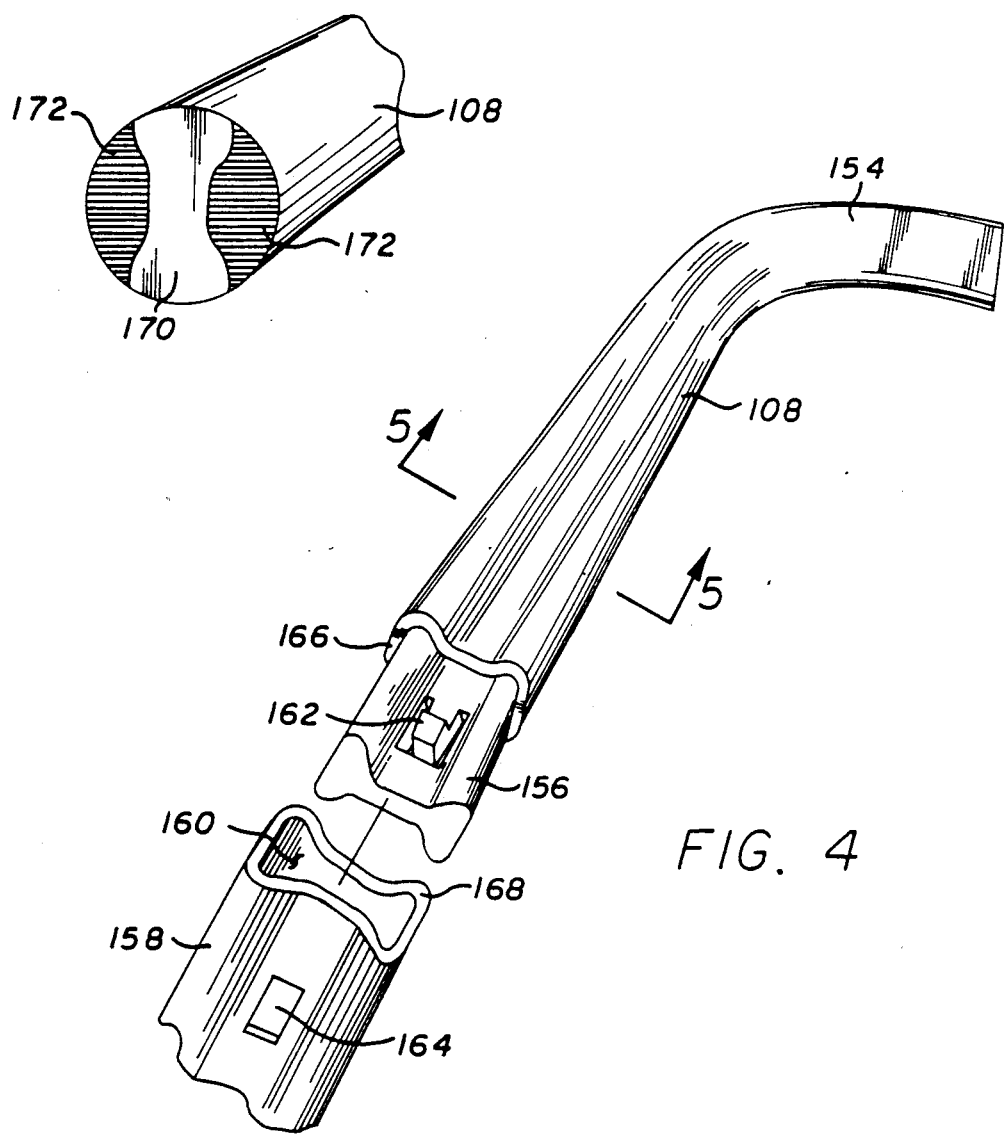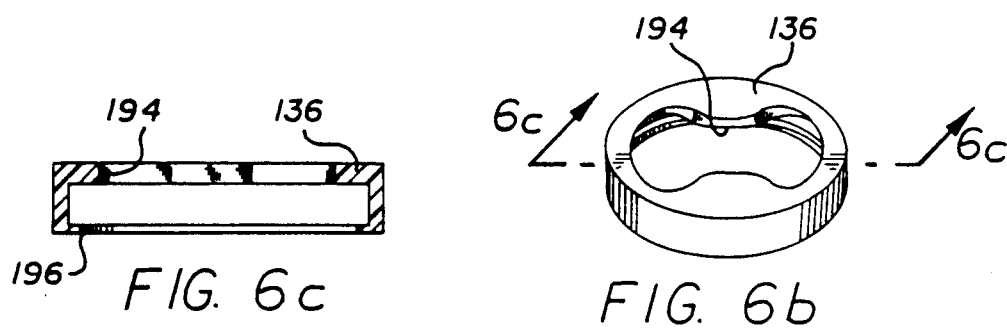

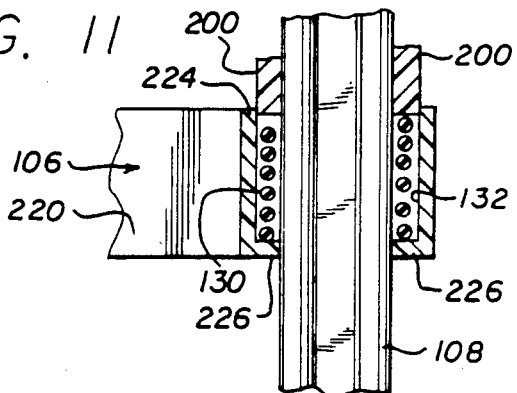
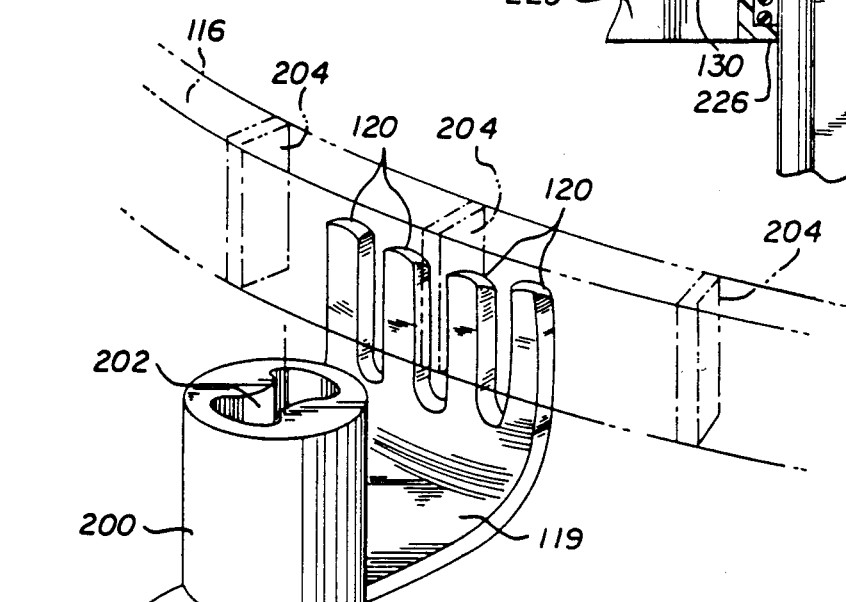
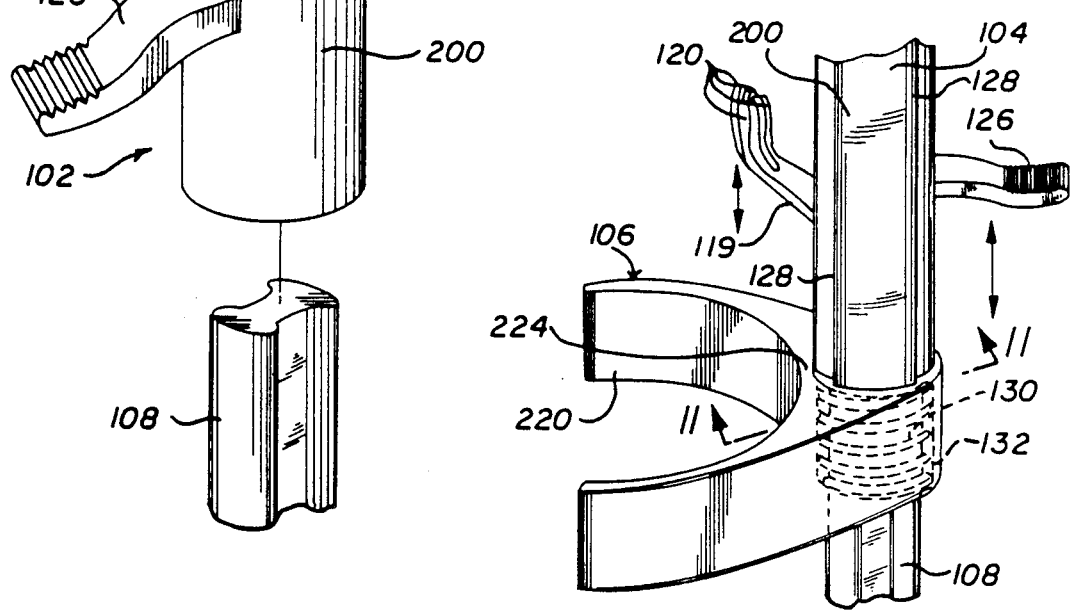

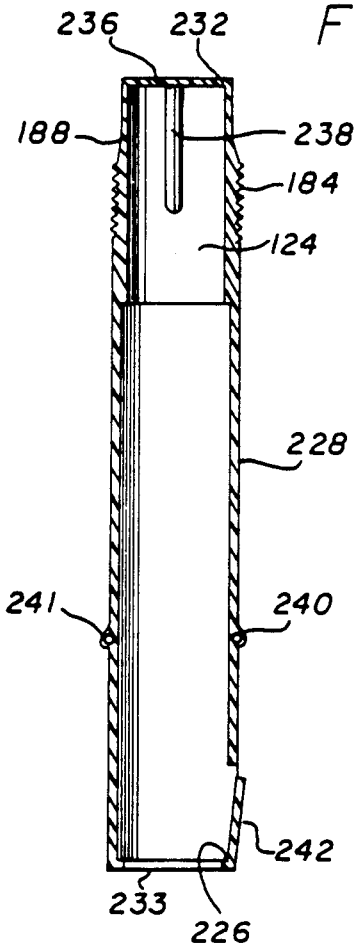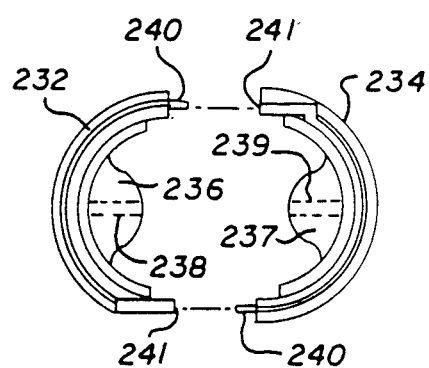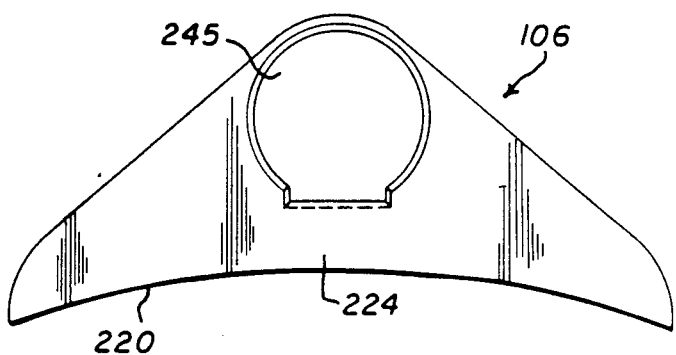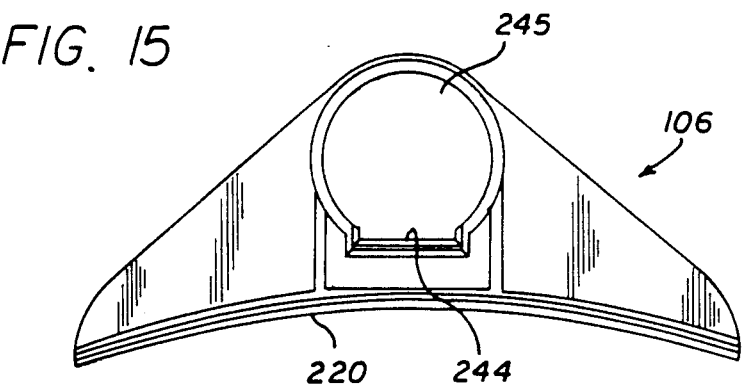

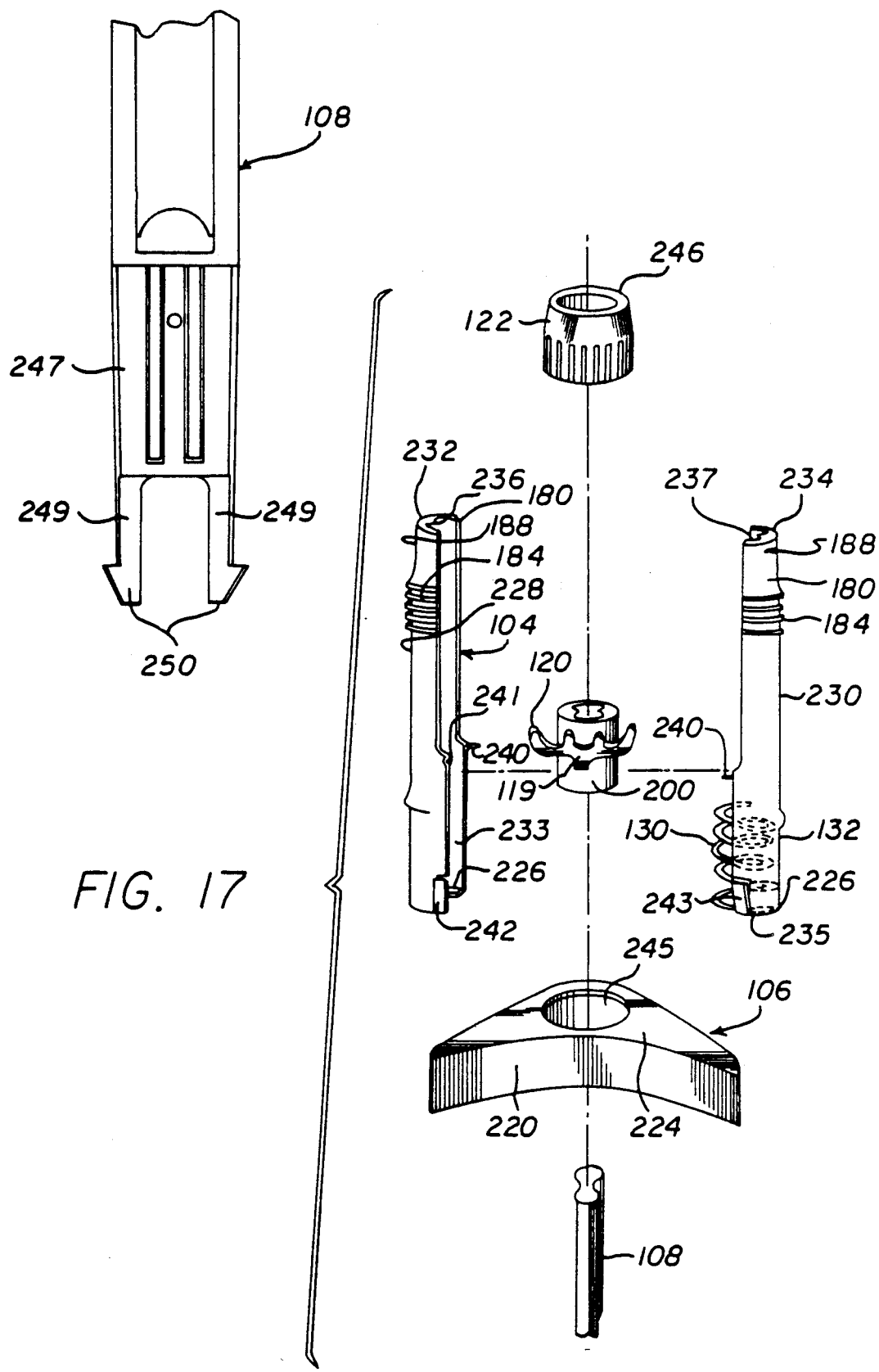

TRASH CAN CADDY AND METHOD OF USE

This application is a continuation-in-part of application Ser. No. 07/232,274, filed Aug 15, 1988, now abandoned.

BACKGROUND OF THE INVENTION

This invention relates to utility hand carts for transporting trash containers, and more particularly, to hand carts of the type having a spring-loaded hook assembly and a level adjustment lock for securing a covered household plastic trash container to the cart.

In the field of sanitation engineering, the use of utility hand carts has long been recognized as an effective way to transport trash containers, and such carts are often employed in each of the commercial, industrial and residential environments. Typically, hand carts are designed for a particular task and thus, carts designed for use in an industrial setting are not suitable for typical household use. A specific example includes a dolly or cart design for transporting fifty-five gallon drum barrels.

Certain dollies and carts on the market are designed particularly for the industrial and commercial settings. Other somewhat lighter gauge dollies are available and adaptable for household use, however, these dollies include a metallic construction with a metal base plate. Therefore, the relatively heavy construction is inconvenient and difficult for use about the home. A lightweight plastic version of a hand cart would be far more convenient for domestic use.

The heavy metal construction of a commercial or industrial dolly can also be hazardous when used about the household. Some metallic dollies and carts are designed to be left lying down for storage with the baseplate projecting upward into the air. This design certainly presents a potentially hazardous condition when the dolly or cart is not in use. Further, the baseplates of the lighter metallic dollies are smaller providing less surface area for the trash can to be balanced thereon. Therefore, an individual must use one hand for balancing the trash can upon the smaller baseplate and the second hand for controlling the dolly or cart.

It is believed that a lightweight, strong, and maneuverable household dolly or caddy which is designed for transporting covered plastic trash cans when the cover is in place is not available. Because other industrial and commercial dollies were not designed to transport plastic trash containers, stabilization of the trash containers while being moved has been a problem. Obviously, the challenge is to prevent loss of control and spilling of the contents of the trash container. In particular, if the cover remains on the trash container, the dolly would have to be carefully rotated backwards on its wheels with one hand used to support the trash container while simultaneously using the second hand for controlling the dolly.

A typical barrel drum dolly does not have a baseplate for the trash can to rest upon and thus, is not domestically suitable. Further, the dolly includes a hook that crosses over the rim and connects to the trash container which cannot be used with the lid of the container in place. Since it is customary to transport trash containers to the street curb prior to municipal garbage collection, it is necessary to cover the containers for a specified period. Therefore, it is inconvenient to transport the trash containers uncovered to the street curb and then to make additional trips to retrieve the cover and secure the can.

Many of the dollies or carts constructed in the past are described as a truck apparatus, some of which include a mechanism for holding the container onto a large platform. Many of the truck constructions of the past were not designed to accommodate containers of varying size. Therefore, if a truck apparatus included a securing device and a support structure for securing the container in place, only those containers of a standard size could be accommodated by a particular truck apparatus. For example, certain hand trucks for transporting pails and cans included a plurality of hook-type latches cooperating with a plurality of keepers for engaging a handle on the can or pail. Secured to the latches was a crossrail which permitted the latches to be moved in unison with each other and with the rail. A coiled retractible spring was included which was anchored to a bar. The spring was designed to automatically pull the latches closed onto the keepers while the latches were connected from the top of the hook facing downward.

Another household utility truck was adjustable for accommodating a considerable variety of supported objects. The truck included a stem-embracing detent having the function of holding the supported object to prevent either forward or rearward tilting. The detent was slidable along a stem which was provided with a stud for preventing undue sliding of the detent. The detent could be disposed at fixed heights for a particular supported object. Another example was a collapsible hand truck which included a construction of parallel pairs of side support members which pivotally connected one pair of side support members to another by employing hinge members.

Yet a further example of a truck apparatus included a sliding hook assembly serving as an adjustment means which was mounted on a main bar and adapted for engaging one side handle of a supported container. An intermediate portion merged on the front end into an upturned hook portion engageable under a handle of the container. A set screw was threadedly engaged in the bight of a U-shaped portion and included an outer end portion projecting laterally for providing a handle adapted to be grasped by a user. Also, the set screw was threadable into engagement with a lower portion of the main bar in selected positions for adjustment at desired locations along the main bar.

Another example of a truck apparatus included a hook member which was slidably mounted on a middle rod. A downwardly projecting hook portion was adapted to hook over the outer rim of a container located on the truck. The hook member was formed of a single piece of flat stock and in addition to the downwardly projecting hook portion comprised an upper horizontal portion, a vertical connecting portion and a bottom laterally extending portion. The portions were provided with registering holes whereby the hook was adjusted up or down along the rod.

A further example included a truck or cart for carrying garbage cans or the like and was comprised of an elongated post which included a can-handle-grasping pair of hooks. The hooks were mounted toward the upper end of the carrier having a strap-like cradle mounted towards the lower end. In addition to including a platform for carrying a can and a plurality of wheels mounted on an axle connected to the post main shaft, the central portion of the strap-like cradle included a rearwardly offset post encircling portion. The encircling portion was snugly received about the post while the actual mounting of the cradle to the post was effected by extending the wheel axle through a pair of aligned holes in the sides of a structural portion. The parallel aligned holes in turn were aligned with an axle-receiving passage through the post. Thus, the axle assisted in the mounting and stabilizing of the cradle while being itself mounted on the post.

The actual grasping and lifting of the can was effected by a pair of forwardly directed hooks positioned towards the upper portion of the post below a handgrip. The hooks were actually defined by a pair of inwardly angled recesses formed in the forward portions of a pair of laterally spaced forwardly projecting platelike arms. The platelike arms constituted the opposed end portions of a platelike rigid member configured as to embrace the upper portion of the post. In order to accommodate the carrier to cans of different heights, the post was provided with a series of holes for the selective accommodation of a fastener and the mounting of a hook forming member in the vertically adjusted position. It should be noted that the hook forming member was not free floating and required disassembly for adjustment.

An additional example of a truck apparatus included a carrier for transporting compressed gas cylinders and further included a set of hook elements at its upper end arranged to suspend the cylinders. Each hook element was described as being pivotable and arranged to engage an internal flange or cutout forming a part of the cylinder. The pivotable hooks were not spring-loaded and were not adjustable along a plurality of vertical side bars of the carrier. The construction further included a plurality of cross bars for structural support.

A final example of a truck included a collapsible wheeled carrier which comprised a container base support assembly, a wheel frame assemble and a handle assemble, all of which could be readily disassembled without tools for compact storage and transportation. The wheeled carrier included a securing means attachable to a handle portion of a standard metal or molded plastic container. A container handle attachment assembly was comprised of a bent hook plate having an upstanding plate portion at the front of a second framework cross bar and an arcuately-curved portion seated against the underside of the second framework cross bar.

The container handle attachment assembly connected to the handle of a standard metal container or of a molded plastic trash container from below. The attachment assembly did not attach itself below the rim or lip of the plastic container and the handle assembly included parallel shafts with cross members. Therefore, the trucks and carts employed in the past for transporting trash containers continue to experience the problems described herein.

Hence, those concerned with the development and use of trucks and utility carts in the sanitation engineering field have long recognized the need for an improved truck, cart or caddy which is designed for transporting a household plastic trash container having a container lid intact and also a spring loaded hook assembly designed for locking underneath a peripheral rim of the plastic trash container with the hook assembly fitted with a level adjustment lock for securing the hook assembly and a support brace at any desired location along a main caddy shaft for transporting a plurality of different sized trash containers. Further, a need has long been recognized for a caddy employed for transporting domestic plastic trash containers, the caddy having a stabilizing basket for cradling the trash can, where the main caddy shaft can be disassembled for display, shipping, storage and transportation, and whereby the caddy may be economically produced and marketed through existing distribution networks. The present invention fulfills all of these needs.

SUMMARY OF THE INVENTION

Briefly, and in general terms, the present invention provides a new and improved trash can caddy construction which substantially reduces the inconvenience of transporting various sized, covered plastic trash containers and significantly improves the stability of transporting such containers by incorporating a novel spring-loaded hook assembly with a cooperating level adjustment lock and a large stabilizing basket. Moreover, the caddy construction of the present invention is designed to hook the trash can from beneath a reinforced peripheral rim, permits the spring-loaded hook assembly to be secured at a selected location along a main caddy shaft, is designed specifically for domestic household use with plastic trash containers having a lid and a reinforced peripheral rim, permits the trash container to be transported while the lid covers the container, provides a main caddy shaft that can be disassembled for display, shipping, storage and transportation, and may be economically produced by employing various available high-strength plastics.

Basically, the present invention is directed to an improved trash can caddy and method of use for transporting plastic trash can containers in the household environment. This is accomplished by providing a spring loaded hook assembly designed for locking under a peripheral reinforced rim of the plastic trash can container. The hook assembly which is integral with an upper support bracket is adjustable along a main caddy shaft and is locked into a designated position by employing a level adjustment lock.

In accordance with the invention, the spring-loaded hook of the hook assembly is designed to engage beneath a peripheral reinforced rim of the plastic trash can container by utilizing spring pressure. The hook assembly and the upper support bracket are adjustable along the main caddy shaft and are locked into a selected position by employing a level adjustment lock. The basket cradles the trash can container for providing greater stability while the container can be transported with the lid intact.

In accordance with the improved method of the present invention, a lock nut of the level adjustment lock is unthreaded for releasing the hook assembly and the upper support bracket. The hook assembly is molded within a hook housing which is integrally connected within the upper support bracket. The support bracket houses a spring within a cavity employed for biasing a hook handle having a plurality of fingers. The hook assembly may then be adjusted along the main caddy shaft to a height consistent with the trash container to be transported. The lock nut of the level adjustment lock is then threaded for securing the hook assembly and support bracket in position.

A base plate of the stabilizing basket is positioned for permitting the trash container to be moved thereon. Then, the hook handle is manually forced downward against spring pressure while the plurality of hook fingers are positioned beneath the reinforced peripheral rim of the trash can. Once the hook handle is released, the plurality of fingers grasp the rim of the plastic container. A handle of the main caddy shaft is then pivoted backwards about an axle mounted in a pair of wheels while simultaneously applying pressure to a toe stop mounted at the base of the stabilizing basket. The trash can container will then be pulled along with the movement of the main caddy shaft and forced onto the base plate of the stabilizing basket. The trash container, the weight of which is now supported by the stabilizing basket, the wheels and axle, and the upper support bracket, may now be transported.

After transport, the trash can container is positioned upright as the hook assembly is forced downward against spring pressure and pulled out from beneath the container peripheral rim as the container is tilted somewhat forward. Then, the stabilizing basket is pulled out from underneath the container after the pressure of the spring-loaded hook assembly has been released. The main caddy shaft can then be disassembled for storage or transport.

The new and improved trash can caddy and method of use substantially improves the efficiency of transporting various sized, covered plastic trash can containers and significantly improves the stability of transporting such containers. Moreover, the caddy construction of the present invention is designed to lock to the container from underneath a reinforced peripheral rim, permits the spring-loaded hook assembly and upper support bracket to be secured at a selected location along the main caddy shaft, permits the container to be transported with the lid intact, can be disassembled for display, shipping, storage and transportation, and is economically produced.

These and other features and advantages of the invention will become apparent from the following detailed description, when taken in conjunction with the accompanying drawings, which illustrate, by way of example, the features of the invention.

BRIEF DESCRIPTION OF THE DRAWINGS

FIG. 2 is a rearward perspective view of a stabilizing basket disassembled from a main shaft of the trash can caddy of FIG. 1;

FIG. 3 is a planar view of the trash can caddy of FIG. 1;

FIG. 4 is a partial perspective exploded view of the main shaft of the trash can caddy of FIG. 1;

FIG. 5 is a cross-sectional view of the main caddy shaft taken along the line 5—5 of FIG. 4;

FIG. 6b is a perspective view of a hook assembly cosmetic cap of the trash can caddy of FIG. 1;

FIG. 6c is a cross-sectional view of the cosmetic cap taken along the line 6c—6c of FIG. 6b;

FIG. 9 is a perspective view of a hook handle and a plurality of fingers of the trash can caddy of FIG. 1;

FIG. 10 is a perspective view of the upper support bracket and spring cavity housing of the trash can caddy of FIG. 1;

FIG. 11 is an elevational view partly in cross-section of the spring cavity housing taken along the line 11—11 of FIG. 10;

FIG. 12 is a partial planar view of an alternative construction of a hook housing of the trash can caddy of FIG. 1 illustrating one of a pair of housing members;

FIG. 13 is an upper end view of the pair of housing members of FIG. 12 each illustrating a partial molded cover;

FIG. 14 is a top planar view of an alternative construction of an upper support bracket of the trash can caddy of FIG. 1;

FIG. 15 is a bottom planar view of the alternative construction of the upper support bracket of FIG. 14; and FIG. 16 is a planar view of the lower portion of the main shaft of the trash can caddy of FIG. 1 illustrating a connecting fastener;

FIG. 17 is an exploded perspective view of an alternative embodiment of a spring-loaded hook assembly of the trash can caddy of the present invention illustrating an integrally connected construction;

DETAILED DESCRIPTION OF THE PREFERRED EMBODIMENT

Figure 1:
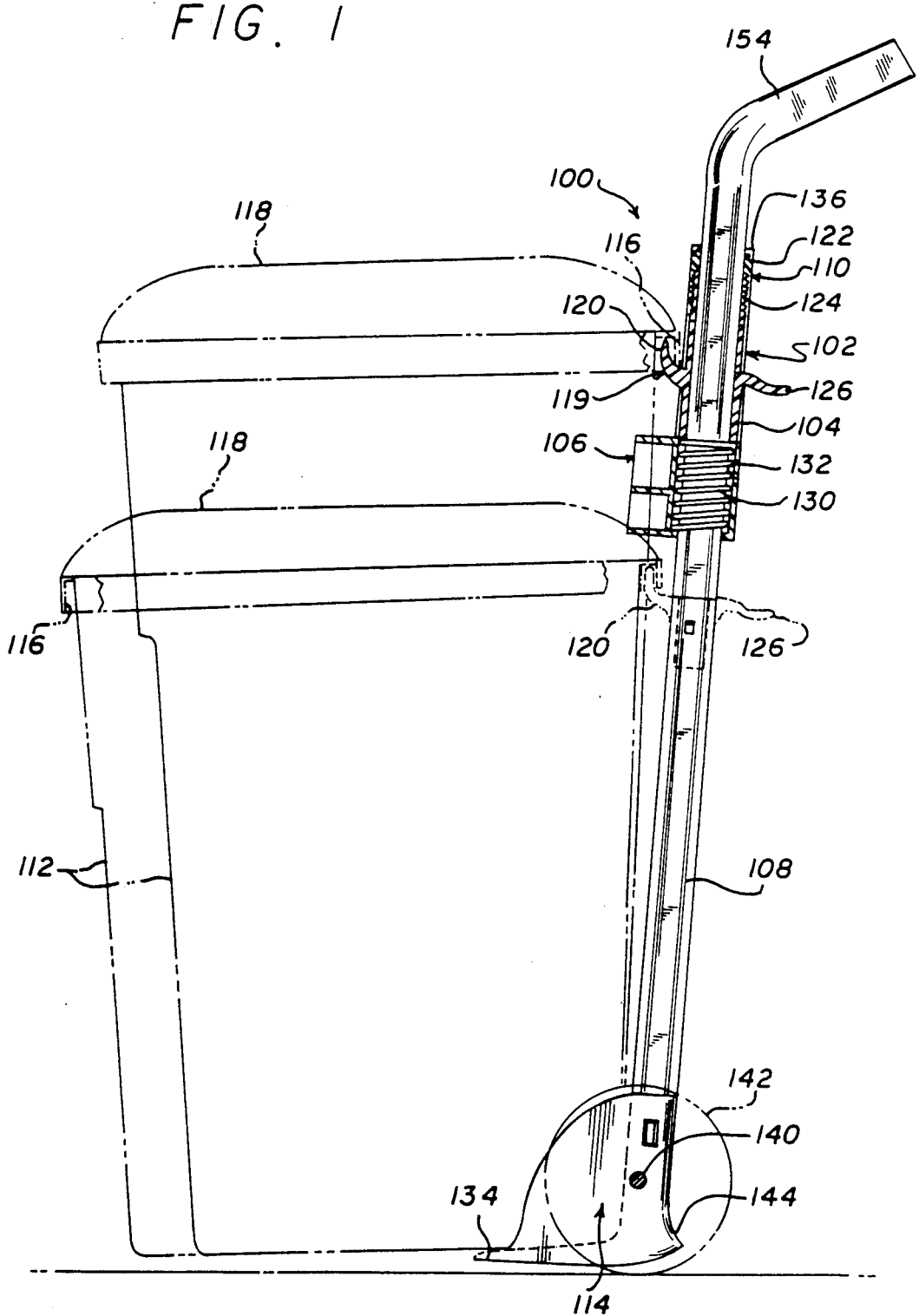
FIG. 1 is a side elevational view of a trash can caddy positioned for transporting a trash can container in accordance with the present invention.

As shown in the drawings for purposes of illustration, the invention is embodied in a trash can caddy 100 of the type having a spring-loaded hook assembly 102 including a hook housing 104 integrally molded to an upper support bracket 106, each slidable along a main caddy shaft 108, and cooperating with a level adjustment lock 110 for accommodating a trash can container 112 supported by a stabilizing basket 114 bracketed to the main shaft.

The plastic trash can industry has become very popular and is widely accepted by the public because of the durability, strength and cost effectiveness of plastic products. Because of the household appeal of plastic products, there is a demand for plastic trash containers which are far more acceptable for use about the home.

The use of utility hand carts has long been recognized as an effective way to transport trash containers. Typically, hand carts, also known as trucks, are designed for a particular task and thus, carts provided for use in a commercial or industrial setting are not suitable for typical household use.

Certain carts which are designed particularly for the commercial or industrial setting and which are fashioned from a somewhat lighter gauge may be adaptable for household use. However, these carts include a construction having a metallic base plate and therefore, the relatively heavy construction is inconvenient and difficult for use about the home.

Further, carts designed for commercial or industrial use also may be hazardous when used about the household. Some metallic carts are designed to be left lying down for storage with the baseplate projecting upward into the air presenting a potentially hazardous condition. Further, the baseplates of the lighter metallic carts are smaller providing less surface area for supporting a trash container.

A continuing problem associated with moving the trash containers has been stabilization with the challenge being to prevent loss of control and spilling of the contents of the trash container. In many of the carts of the past, if the lid remained intact during transportation, the cart would have to be carefully rotated about the wheel axle with one hand used to support the trash container while simultaneously using the other hand for controlling the cart.

Many examples of carts existing in the past are available. One such example includes a typical barrel drum dolly comprised of a hook that crosses over the rim and connects to the trash container. Such a dolly is not designed to be used when the lid of the container is in place. Further, many of the truck constructions of the past were not designed to accommodate containers of varying size and in some cases only those containers of a standard size could be accommodated by a particular cart. Another example included a hand truck comprised of a plurality of hook-type latches cooperating with a plurality of keepers for engaging a handle on a can or pail.

Another example included a household utility truck which was adjustable for accommodating a considerable variety of supported objects which included a stem-embracing detent having the function of holding the supported object to prevent either forward or rearward tilting. A further example of a truck included a sliding hook assembly serving as an adjustment means which was mounted on a main bar and adapted for engaging one side handle of a supported container. An intermediate portion merged on the front end into an upturned hook portion engageable under a handle of the container.

Yet another example of a truck included a hook member which was slidably mounted on a middle rod. A downwardly projecting hook portion was adapted to hook over the outer rim of a container located on the truck. By contrast, a further example included a truck for carrying garbage cans which was comprised of an elongated post which included a can-handle-grasping pair of hooks which were mounted towards the upper end of the carrier having a strap-like cradle mounted towards the lower end. The actual grasping and lifting of the can was effected by the pair of forwardly directed hooks which were positioned towards the upper portion of the post below a handgrip.

An additional example included a carrier for transporting compressed gas cylinders which included a set of hook elements at its upper end arranged to suspend the cylinders. Each hook element was pivotable and arranged to engage an internal flange or cutout forming a part of the cylinder. A final example included a truck having a collapsible wheeled carrier which comprised a container base support assembly, a wheel frame assembly and a handle assembly, all of which could be readily disassembled without tools for compact storage and transportation. The container handle attachment assembly connected to the handle of a standard metal container or of a molded plastic trash container from below but did not attach itself below the rim of the plastic container.

In accordance with the present invention, the spring-loaded hook assembly 102 and the upper support bracket 106 cooperate with the level adjustment lock 110 for substantially improving the efficiency of transporting various sized, covered plastic trash containers 112 and for significantly improving the stability of transporting such containers seated on the stabilizing basket 114. Further, the caddy construction is designed to grasp the trash can container 112 from beneath a reinforced peripheral rim 116 of the container, permits the spring-loaded hook assembly 102 to be secured at a selected location along the main caddy shaft 108, permits the trash can container to be transported while a closure lid 118 covers the container, includes the feature that the main caddy shaft can be disassembled for displaying, shipping, storing and transporting in a compact container, while the caddy 100 can be economically produced especially for household use by utilizing various high-strength plastics.

The trash can caddy 100 may be employed for transporting any trash can container 112 including those of non-standard sizes. In general, the spring-loaded hook assembly 102, comprised of a hook 119 having a plurality of upward extending fingers 120, is released by unthreading a lock nut 122. The lock nut is secured to a threaded segmented sleeve 124 extending upward from the level adjustment lock 110. Upon releasing the lock nut 122, the entire hook assembly 102 including the hook housing 104 and the upper support bracket 106 is free to move vertically along the main caddy shaft 108.

The hook assembly should be positioned to a point which is slightly above the reinforced peripheral rim 116 of the trash container to be transported. At this location, the lock nut 122 should be secured which tightens the segmented sleeve 124 about the main caddy shaft 108 as hereinafter described in FIGS. 6a and 8. Once the hook assembly a hook handle 126 extending through a vertical slot 128 formed along the vertical dimension of the hook housing 104 (shown best in FIG. 6a) may be operated against a spring 130 mounted in a spring cavity 132 (as shown in FIGS. 10 and 11).

Connected to and extending in a direction opposite to the hook handle 126 is the hook 119 including the plurality of fingers 120, both of which move with the hook handle 126 when operated. Once the bottom of the trash can container 112 is manipulated onto a baseplate 134 of the stabilizing basket 114, the hook handle 126 may be forced downward against the pressure of the spring 130 permitting the plurality of fingers 120 to be placed under the reinforced peripheral rim 116 of the trash container, as is illustrated in FIGS. 1 and 9. Note that a larger trash container 112 is illustrated in phantom in FIG. 1 for demonstrating that the lock assembly 102 may be adjusted to accommodate the larger container. Further, it should be noted that the container 112 may be transported by the trash can caddy 100 while the closure lid 118 is intact.

Upon close inspection, it becomes evident that the upper support bracket 106, the hook housing 104, and the level adjustment lock 110 comprise an integral molded piece of, for example, plastic with the main caddy shaft 108 passing therethrough. Because the main caddy shaft is formed into an I-beam (as shown in FIG. 5) while the lock nut 122 of the level adjustment lock is formed from round stock, there exists a void between these two pieces. Therefore, a cosmetic cap 136 is mounted to the top of the lock nut 122.

The stabilizing basket 114 is a single molded unit having a penetration 138 formed in the top thereof for receiving the bottom end of the I-beam main caddy shaft 108. The penetration 138 includes therein a snap fastening device for securing the bottom end of the main caddy shaft to the stabilizing basket. Molded into the rearward portion of the basket 114 is an axle 140 including a pair of rotating wheels 142 attached to the ends of the axle as is illustrated in FIG. 2. For the sake of clarity, only a single wheel is illustrated so that the axle 140 may be clearly shown. The axle may be comprised of, for example, metal while the stabilizing basket 114 is comprised of, for example, a high strength plastic similar to that utilized for the main caddy shaft 108. However, the wheels 142 may be fabricated from any suitable material. The basket 114 is fashioned into a rounded stabilizing construction for capturing the bottom and lower sides of the container 112 during transporting thereof.

Located on the rearward side of the basket 114 and adjacent to the molded axle 140 is a toe stop 144 employed for assisting in tilting the trash can caddy 100 backwards during the loading and transporting stages of the container 112. During the loading operation, a concave portion 146 of the baseplate 134 is positioned adjacent the bottom of the container 112. The container may be tilted slightly forward for permitting the concave portion 146 of the baseplate to be slipped underneath the bottom of the container as is illustrated in FIG. 3.

The penetration 138 which houses a snap fastener 148 (not clearly shown) for receiving the I-beam main caddy shaft 108 is also illustrated in FIG. 3. Although the stabilizing basket 114 is not molded to the bottom of the main caddy shaft 108 in the preferred embodiment, alternative forms of this connection may include such a unitary molding. In addition to the axle 140 and the plurality of rotating wheels 142, a washer 150 and a push nut 152 are each shown in FIG. 3. Also clearly illustrated is a top view of the main caddy shaft 108 as it fits into the penetration 138.

It should be noted that as a rearward pulling force is applied to a handle 154 of the main caddy shaft 108, an additional force is applied to the toe stop 144 for tilting the trash can caddy and the container in the rearward direction. Note that during the transporting of the container 112, it is the rotating wheels 142 that actually turn since the axle 140 is immovably molded into the rearward section of the stabilizing basket 114.

The main caddy shaft 108 may be disassembled into a plurality of interlocking sections as illustrated in FIG. 4. A typical interlocking section is comprised of a male section 156 and a female section 158. The male section 156 may extend from the handle 154 and be formed in the shape of an I-beam having a dimension smaller than the I-beam dimension of the main caddy shaft 108. However, the female interlocking section 158 has a hollow portion 160 for receiving the male interlocking section 156. The male interlocking section further includes an interlocking tab 162 which mates with a receiver hole 164 located on the female interlocking section 158.

In assembling the male interlocking section 156 to the female interlocking section 158, the male section is inserted into the hollow portion 160 of the female section until a butt end 166 of the male section 156 meets a facing 168 of the hollow portion 160. At this point, the interlocking tab 162 is captured by the receiving hole 164. The two sections are then connected together. In order to disassemble the respective parts, a lateral force is applied to the interlocking tab 162 through the receiver hole 164 while a pulling force is applied to the male interlocking section as the female interlocking section is held stationary.

The advantage of the disassembling feature permits the trash can caddy 100 as well as the main caddy shaft 108 to be shipped in compact collapsible storage container boxes. Further, the disassembling feature permits the caddy to be warehoused in the compact boxes. From a merchandising view, the disassembled caddy may be displayed while conserving valuable shelf space. This collapsible storage feature is one not commonly found in other hand carts which are generally shipped, stored and sold fully assembled.

Generally, the main caddy shaft may be disassembled at two locations. The first includes a point located between the base of the caddy shaft handle 154 and the hook assembly 102. A second point is located along the main caddy shaft between the upper support bracket 106 and the stabilizing basket 114. However, the design may include any number of interlocking joints for accommodating the disassembling of the trash can caddy 100. Further, a molded handle grip or a slip-on plastic or rubberized handle grip may be provided for the handle 154 for assisting in transporting the container 112 and for assembling and disassembling the main caddy shaft.

If the main caddy shaft 108 is separated, a cross-sectional view is disclosed as is shown in FIG. 5. A center core 170 is disclosed exhibiting an I-beam construction having the dimensions of the butt end 166. The center core 170 is solid and is shown as being fabricated from circular stock. Those portions 172 of the circular stock that have been removed for forming the I-beam are marked accordingly. The I-beam construction provides structural support and molding convenience and also prevents the spring-loaded hook assembly 102 and the upper support bracket 106 from rotating about the main caddy shaft. This rotation prevention feature is achieved by means of a matching I-beam shaped penetration molded into the level adjustment lock 110, the hook housing 104, and the upper support bracket 106 similar to the penetration 138 formed in the top of the stabilizing basket 114. Because the matching I-beam shaped penetration fills the removed portions 172 as shown in FIG. 5, the main caddy shaft 108 is prevented from rotating.

Figure 6A:
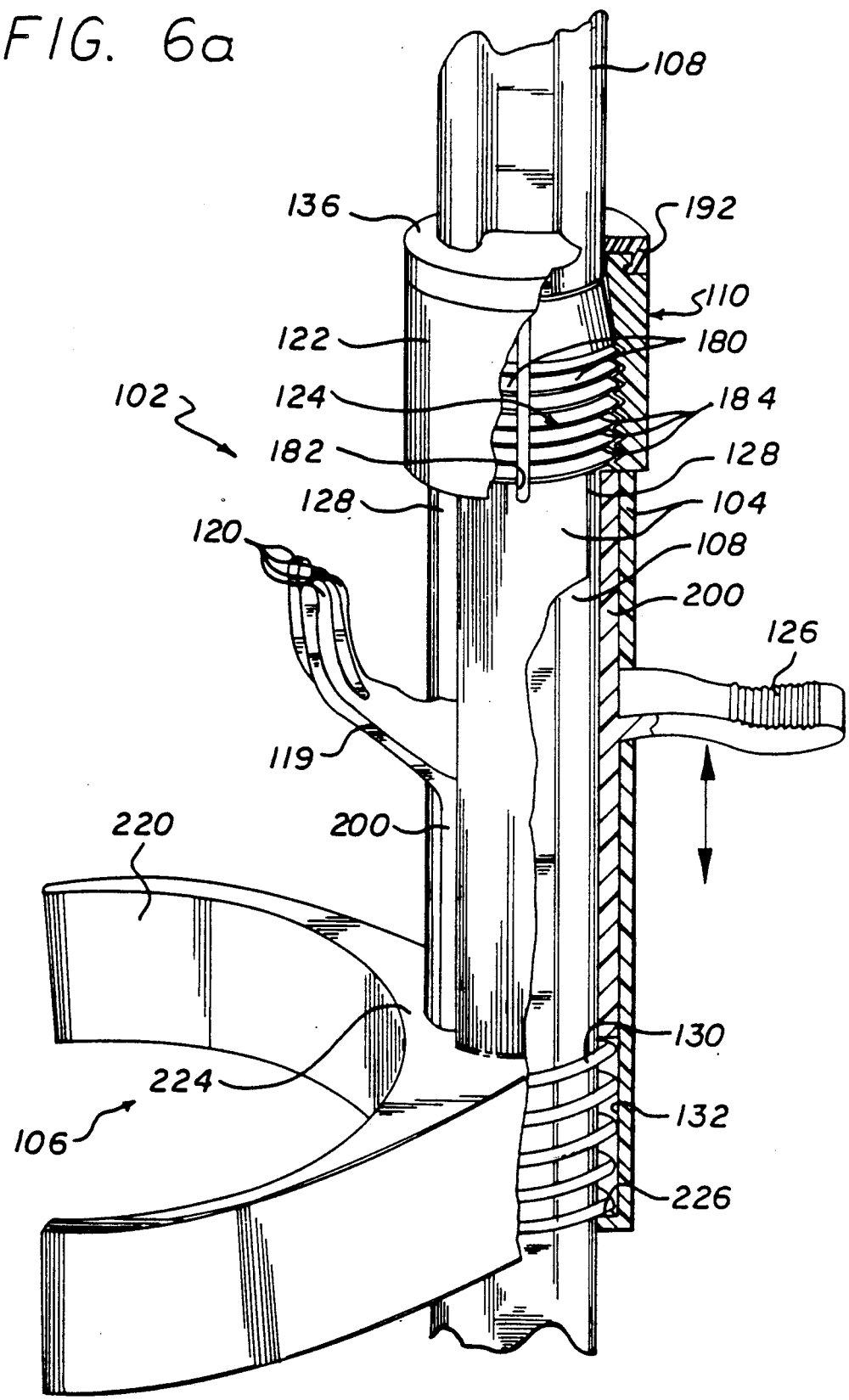
FIG. 6a is a perspective view partly in cross-section of an upper support bracket and a hook assembly of the trash can caddy of FIG. 1.

The spring-loaded hook assembly 102 which includes the level adjustment lock 110, the hook housing 104, the combination of the hook 119 with the plurality of fingers 120 and the hook handle 126, the upper support bracket 106, and spring cavity 132 with the spring 130 located therein is illustrated in FIG. 6a. In particular, the upper support bracket, the hook housing and the level adjustment lock are comprised of a unitary molded piece.

At the top of the hook assembly 102 is the level adjustment lock 110 which includes the lock nut 122 with the segmented sleeve 124 threaded therein. The segmented sleeve has been formed to include a plurality of tongues 180, each separated by a space 182 from an adjacent tongue. The design requires that upon threading the lock nut 122 over the segmented sleeve 124, each of the tongues will be compressed against the main caddy shaft 108.

The outer surface of the segmented sleeve 124 includes a plurality of threads 184 formed across the plurality of tongues 180 for mating with a plurality of threads 186 formed on the inside of the lock nut 122. It should be noted that there is no tapering effect to the plurality of threads 184 located on the exterior of the segmented sleeve 124 or on the plurality of threads 186 located on the inside of the lock nut 122. The outer diameter of the threads of the segmented sleeve are constant as is the inner diameter of the plurality of threads located on the interior of the lock nut.

Figures 7, 8:
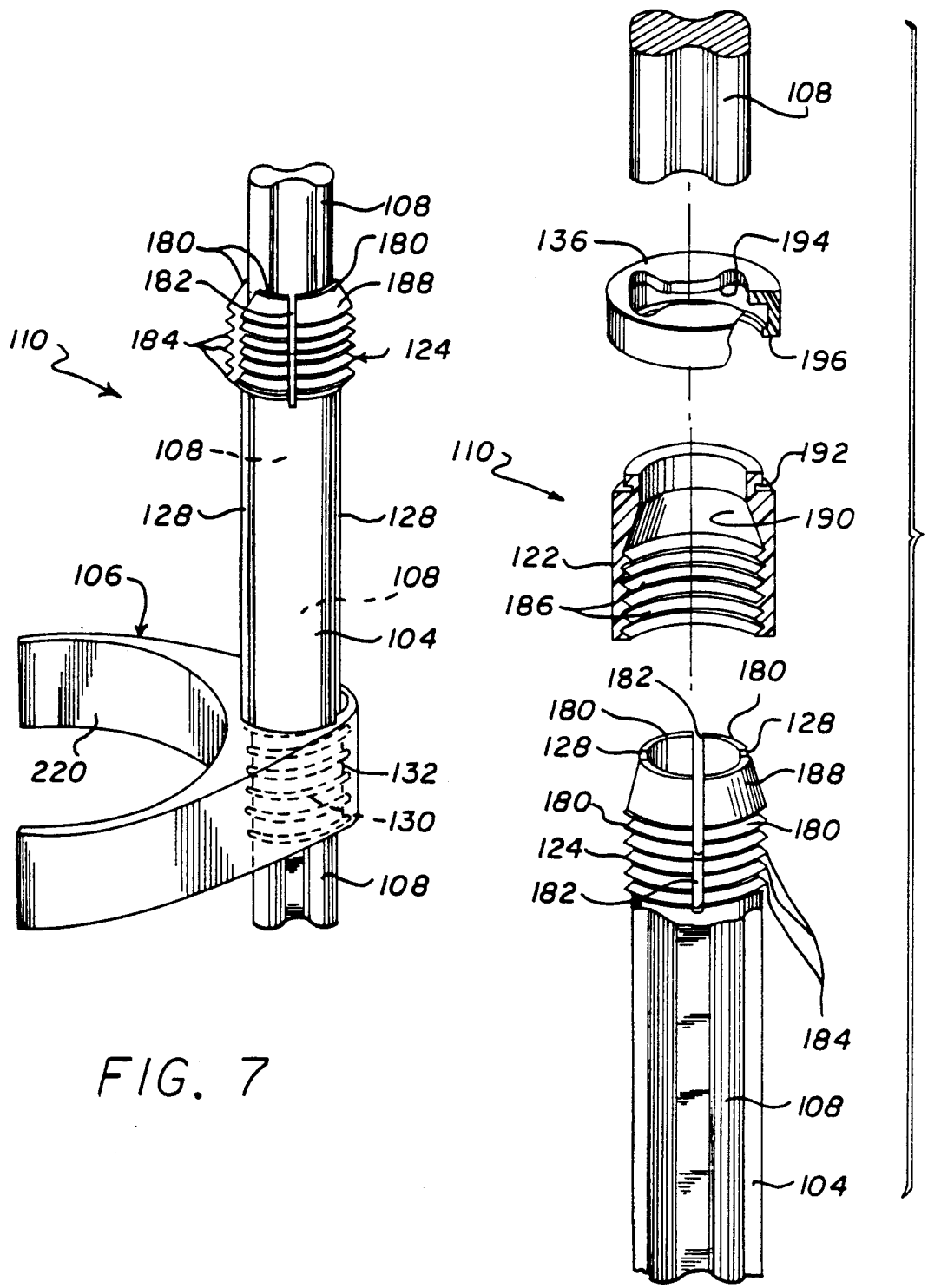
FIG. 7 is a perspective view of an integrally molded upper support bracket and hook housing of the trash can caddy of FIG. 1.
FIG. 8 is a frontal exploded view partly in cross-section of a level adjustment lock of the trash can caddy of FIG. 1.

In order for the lock nut 122 to cause the segmented sleeve 124 to lock the hook assembly 102 to the main caddy shaft 108 during adjustment, there must be a constricting effect. This constricting effect is provided by a tapering at the top of the lock nut 122 and at the top of the segmented sleeve as illustrated in FIG. 8. This requirement is accomplished by terminating the top end of each tongue 180 of the segmented sleeve in a conical shape 188 while simultaneously fashioning the interior top of the lock nut into a smaller cone receiver 190. Therefore, when the lock nut 122 is threaded over the segmented sleeve, the larger conical shaped terminal end is forced into the smaller cone receiver 190 for providing the required constricting fit.

The tightening of the lock nut 122 secures the hook assembly 102 at a preselected location along the main caddy shaft 108. Therefore, the hook assembly and the upper support bracket 106 may be adjusted to a position to accommodate any particular trash can container 112. Likewise, unthreading the lock nut releases the constricting hold on the segmented sleeve 124 permitting the hook assembly and the upper support bracket to be readjusted.

Because the construction of the hook assembly 102 and the upper support bracket 106 are formed of round stock, a void exists between the round stock and the I-beam construction of the main caddy shaft 108. This void is illustrated at the removed portions 172 shown in FIG. 5. To close off or block the void space, the cosmetic cap 136 is locked to a rim 192 formed in the top of the lock nut 122 as is illustrated in FIG. 6a. Although the lock nut is free to rotate for locking and unlocking the level adjustment lock, the cosmetic cap 136 cannot rotate since the main caddy shaft 108 passes through the cap. The cap includes an opening 194 shaped in the form of an I-beam for accommodating the main caddy shaft as is illustrated in FIG. 6b. Further, the cap includes a small lip 196 located on the bottom side of the cap which snaps into the rim 192 when installed as shown in FIG. 6c.

The hook assembly 102 includes the plurality of fingers 120 and the hook handle 126, each extending through one side of the continuous slot 128 as is shown in FIG. 6a. The hook assembly further includes a cylindrical skirt 200 includes a penetration 202 for permitting the I-beam shaped main caddy shaft 108 to pass therethrough which prevents rotation of the hook assembly about the main caddy shaft (shown in FIG. 9). The cylindrical skirt is enclosed within the hook housing 104 and is aligned to interface with the spring 130 mounted in the spring cavity 132 within the upper support bracket 106.

The function of the hook assembly 102 is to permit the plurality of fingers 120 to be placed underneath the reinforced peripheral rim 116 for grasping the trash can container 112. This is accomplished by manually pushing downward on the hook handle 126 for applying pressure to the top of the cylindrical skirt 200 which is transferred directly to the spring 130. As the cylindrical skirt is forced downward against the spring pressure, the plurality of fingers 120 are carried therewith for permitting the placement of the fingers underneath the peripheral rim of the container.

When the hook handle 126 is released, the spring force drives the plurality of fingers 120 to the top of the travel which is limited by the height of the outer peripheral rim of the container 112. The bottom travel limit of the hook handle 126 is limited by the location of the upper support bracket 106.

The peripheral rim 116 of the trash can container 112 includes a plurality of reinforcing ribs 204 for providing structural support to the rim. The ribs 204 are generally spaced at measured intervals so that it is necessary for the hook assembly to be a width which can be fitted between the ribs. Therefore, one of the many advantages and distinguishing features of the instant invention is that each of the plurality of fingers 120 will easily fit between the ribs 204 as is illustrated in FIG. 9. Because the reinforced peripheral rim 116 is generally circular in nature, the plurality of fingers 120 include a slight radius to permit the hook assembly to conform to the radius of the plastic trash container 112.

Both the hook handle 126 and the hook 119 including the plurality of fingers 120 extend through the continuous slot 128 for accessing the peripheral rim 116 shown best in FIG. 6a. The slot 128 is actually formed continuously through the hook housing 104 which otherwise exhibits a unitary construction. Note that slot 128 is molded into the hook housing 104 for accommodating the vertical movement of the hook handle 126 and the hook 119. Because the hook housing is integrally molded to the upper support bracket 106, the operation of the hook remains unchanged notwithstanding the locked position of the entire hook assembly 102.

Being integrally molded to the hook housing 104, the upper support bracket 106 moves in unison with the spring loaded hook assembly 102 with each adjustment along the main caddy shaft 108. The support bracket is a structural element having a concave surface 220 for mating with and providing support to the trash can container 112 (see FIGS. 7 and 10) after the trash can caddy 100 has been tilted backwards on its rotating wheels 142. The support bracket is comprised of heavy duty construction for supporting heavy loads.

Molded within the upper support bracket 106 is the spring cavity 132 which is employed for housing the spring 130 as shown in FIGS. 10 and 11. This structure is designed such that a wall 224 (see FIG. 11) acts as a dividing partition for separating the interior of the upper support bracket 106 from the spring cavity 132. The main caddy shaft 108 passes through the spring cavity with the spring 130 fitted thereabout. The spring is mounted on a ledge 226 formed at a bottom portion of the cavity which surrounds the shaft. Because of the integrally molded structure within the upper support bracket, the spring cavity moves with the hook assembly 102 during readjustment along the main caddy shaft. Thus, the spring cavity moves with the upper support bracket as a stationary part thereof and slides across the I-beam main caddy shaft during the adjustment procedure.

During assembly of the components of the trash can caddy, the entire hook assembly 102 which includes the level adjustment lock 110, the hook housing 104, and the upper support bracket 106 is positioned for the installation of the main caddy shaft 108. The I-beam shaft may at this point be passed through the top of the level adjustment lock through the hook housing and the bottom of the spring cavity 132. The remaining components to be assembled include the spring 130, the cylindrical skirt 200, the lock nut 122 and the cosmetic cap 136. Because of the existence of the slot 128 which passes continuously through the entire hook assembly 102, the two halves of the hook housing may be separated by pulling them apart as shown in FIG. 7.

Once the two halves of the hook housing have been separated, the spring 130 may be slipped over the I-beam main caddy shaft and dropped through the level adjustment lock in the hook housing. The spring will ultimately come to rest in the bottom of the spring cavity 132 located within the upper support bracket 106. The spring actually rests on the ledge 226 shown in FIG. 11 and is, in general, not fastened to the ledge. The cylindrical skirt 200 which includes the penetration 202 formed for receiving the I-beam shaft is then permitted to pass through the level adjustment lock and come to rest on top of the spring 130. The hook 119 including the plurality of fingers 120 and the hook handle 126 each extend from the boundary of the hook housing 104 through the continuous slot 128 upon insertion into the segmented sleeve 124.

After these components have been assembled, the lock nut 122 is passed over the main caddy shaft so that the plurality of threads 186 located inside the lock nut can be mated with the plurality of threads 184 located on the exterior surface of the segmented sleeve 124. The lock nut is turned so that the plurality of tongues 180 are forced together compressing against the main caddy shaft and directing the conical shape terminal end 188 of the segmented sleeve into the cone receiver 190 of the lock nut 122.

Finally, the I-beam shaft is passed through the cap opening 194 of the cosmetic cap 136 so that the cap comes to rest atop the lock nut 122. This permits the lip 196 of the cap to fit within the rim 192 located on the lock nut. The trash can caddy 100 is now completely assembled and readjustment of the position of the hook assembly and upper support bracket may be accommodated simply by unthreading the lock nut and adjusting the hook assembly along the main caddy shaft. Once the desired position has been reached, the lock nut is again tightened forcing the conical shape terminal end 188 of the segmented sleeve 124 into the cone receiver 190 causing the plurality of tongues 180 to constrict against the main caddy shaft securing the hook assembly in place. After the lock nut has been secured, the spring 130 and the hook 119 are fixed in place.

In the alternative, the combination of elements including the spring 130, the cylindrical sleeve 200, the lock nut 122 and the cosmetic cap 136 may be initially inserted into the hook assembly 102 and once aligned, the I-beam shaped main caddy shaft 108 may be inserted thereafter. The remaining steps of the adjustment procedure are identical to those previously described.

Variations in construction of the preferred embodiment as disclosed in FIGS. (1-11) are illustrated in FIGS. (12-18) and described hereinbelow. One such variation includes dividing the hook housing 104 into a pair of opposite housing portions 228, 230 as is clearly illustrated in FIGS. 12 and 17. For the sake of clarity, only the left hook housing portion 228 as illustrated in FIG. 17 will be described and shown in other views (such as in FIGS. 12). In addition to each of the housing portions 228, 230 being independent from one another, each housing portion is also separate from the upper support bracket 106 as is shown in FIG. 17. Although the integrally molded construction described in FIG. 6a of the preferred embodiment is not utilized in the construction variations introduced in FIGS. (12-18), an integrally connected construction is employed.

Figure 18:
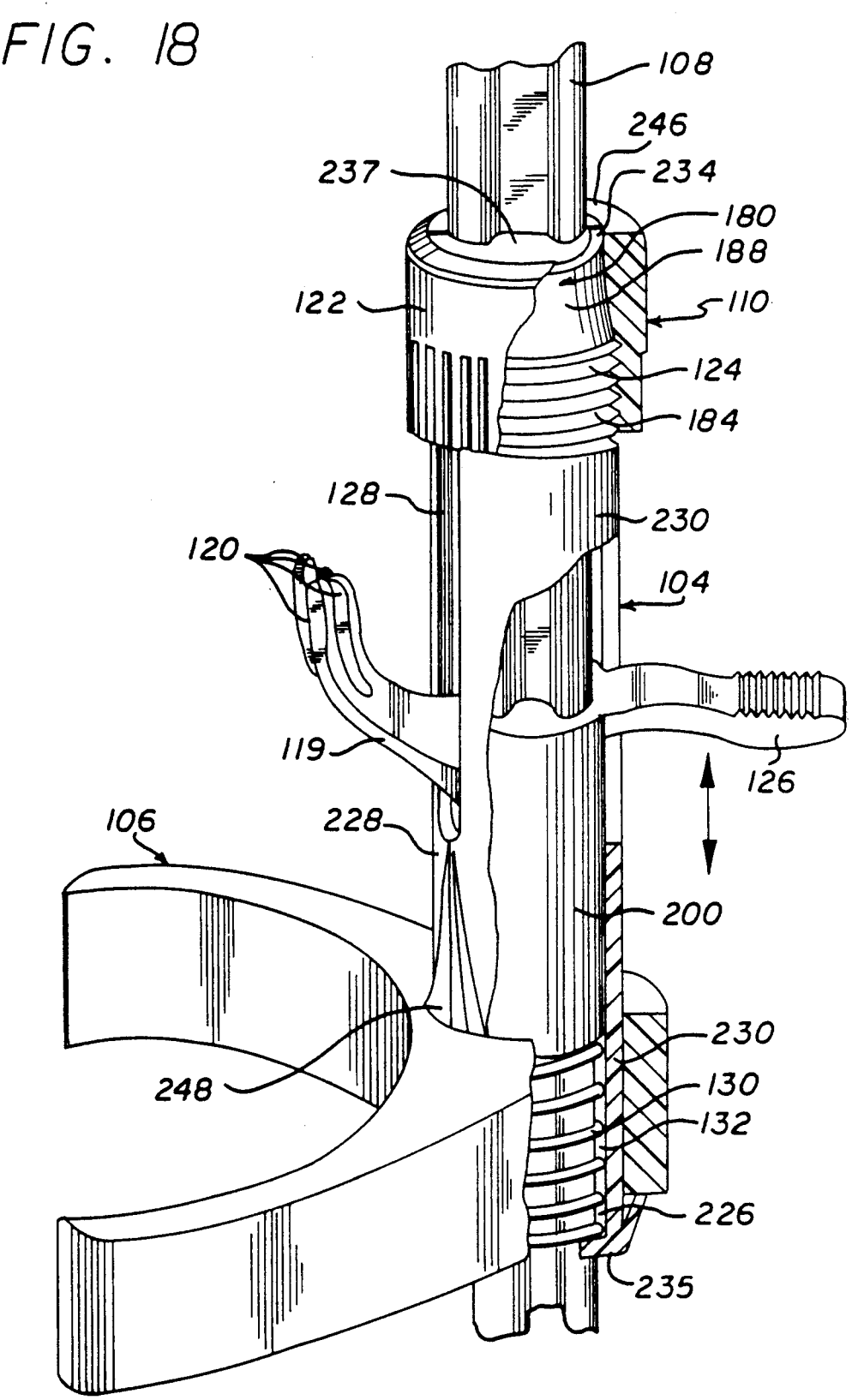
FIG. 18 is a perspective view partly in cross section of the level adjustment lock, upper support bracket and hook assembly of the trash can caddy of FIG. 17.

The hook housing portion 228 includes an upper end 232 and a lower end 233 while the housing portion 230 includes an upper end 234 and a lower end 235. Note that the threaded segmented sleeve 124 is located below the upper ends 232, 234 as is shown in FIGS. 12 and 18. Formed on the outside of the segmented sleeve 124 is the plurality of threads 184 which tape into the conical shaped terminal end 188 as is shown in FIG. 12 and as previously described with respect to FIG. 7. Mounted on each of the upper ends 232, 234 respectively is one of a pair of end covers 236, 237 as is clearly shown in FIG. 13. Each end cover serves to close the voids created by the removed portions 172 on the main shaft 108 as is clearly shown in FIG. 5. The end covers are molded onto the upper ends 232, 234 to enclose the voids on each side of the main caddy shaft. Such a construction variation eliminates the need for the cosmetic cap 136.

Each end cover 236, 237 includes a vertical support member 238, 239 respectively as is clearly shown in FIGS. 12 and 13. Each of the vertical support members 238, 239 is utilized for increasing the compressive force applied to the plurality of tongues 180 of the segmented sleeve 124 by the level adjustment lock 110 as the locknut 122 is tightened. This function is accomplished since the vertical wall of each of the support members adds structural rigidity to the terminal ends 188 providing increased frictional pressure applied therefrom. It is noted that the left housing portion 228 and the right housing portion 230 serve as the segmented sleeve 124 as is shown in FIGS. 17 and 18 (and as previously shown in FIG. 8). The two housing portions are conveniently compressed together when the locknut 122 is tightened.

It is noted that the two housing portions 228, 230 are initially connected together by an interference fit scheme such as one employing a plurality of male pin registers 240 and corresponding female receptacles 241 as is shown in FIGS. 12, 13 and 17. The plurality of pin registers 240 and receptacles 241 may be conveniently formed at any available location along the interface of the housing portions 228, 230 and are most clearly illustrated in FIG. 13. Generally, the pin registers and the female receptacles are formed during the molding process.

Finally, each housing portion 228, 230 respectively includes one of a pair of resilient locking devices 242, 243, each of which are located adjacent the lower ends 233, 235 of the housing portions 228, 230. Each of the locking devices 242, 243 can be a snap lock comprised of plastic or metal for being captured in a corresponding receptacle 244 located within the upper support bracket 106 as shown in FIG. 15. The receptacle 244 is sufficiently wide to accommodate both of the locking devices 242, 243 simultaneously. Upon inserting the coupled lower ends 233, 235 (e.g., the bottom of the hook housing 104) into the top of the upper support bracket 106, the receptacle 244 captures the locking devices for locking the housing portions in the support bracket. The support bracket functions, in this mode, as a clamping device for securely holding the two housing portions 228, 230 together. The two resilient locking devices are releasable from the receptacle 244 from underneath the bracket 106 by utilizing a blunt instrument to deflect the two locking devices.

A top view of the upper support bracket 106 is illustrated in FIG. 14 while a bottom view is shown in FIG.

15. The concave surface 220 which contacts the trash can container 112 and the wall 224 which separates the concave surface 220 from a penetration 245 fashioned to receive the hook housing 104 and the spring cavity 132 are both shown. The main distinguishing feature between the upper support bracket shown in FIGS. (6a, 7 and 10) and that shown in FIGS. (14 and 15) is that the bracket in FIGS. 14 and 15 includes the receptacle 244 for receiving the resilient locking devices 242, 243 so that the hook housing 104 is integrally connected to the bracket in lieu of being integrally molded thereto.

Because the housing portions 228, 230 are secured within the upper support bracket 106, the spring cavity 132 is formed within the assembled housing portions The spring 130 is then inserted into the cavity and seated onto the ledge 226 formed within the lower ends 233, 235 as shown if FIGS. 17 and 18. Once the housing portions are assembled, the spring and cavity operate in the same manner as previously described with reference to FIG 11. Mounted directly above the spring 130 is the cylindrical skirt 200 which carries the hook 119 and the hook handle 126, each integrally connected to the skirt 200. The two housing portions 228, 230 are fashioned in such a manner so that upon assembly, the vertical slot 128 is formed at the interface of the two housing portions which also assists in forming the threaded segmented sleeve 124 as shown in FIGS. 17 and 18. Therefore, the hook 119 and the handle 126 each extend outwardly in opposite directions from the slot 128 providing physical access thereto as previously described. The hook 119 carries the plurality of upwardly extending fingers 120, each of which are formed in an arcuate manner to accommodate reception thereof underneath the curved reinforced peripheral rim 116 of the container 112.

When the two housing portions 228, 230 are fitted together and inserted into the upper support bracket, the travel of the assembled housing portions down into the upper support bracket 106 is limited by a slight moldout 248 formed on the housing portions as shown in FIG. 18. After assembling each of the elements of the hook assembly 102, the main caddy shaft 108 can be passed through the bottom of the hook housing 104, the spring 130, the spring cavity 132 and the level adjustment lock 110. The entire hook assembly 102 can be positioned on the main shaft to accommodate the height of the container 112 to be transported. After adjusting the height of the hook assembly 102, the locknut 122 is threaded onto the segmented sleeve 124 to produce a compressive frictional grip between the segmented sleeve and the main shaft as previously described. It is noted that since this variation of the preferred embodiment dispenses with the cosmetic cap 136, the locknut 122 does not include the rim 192 but does include a smooth round opening 246 on the topside thereof as shown in FIGS. 17 and 18.

Once the hook assembly is fixed in position, a bottom end 247 of the main caddy shaft 108 is inserted into the penetration 138 formed in the top of the stabilizing basket 114. In lieu of the bottom end 247 being captured by the snap fastener 148, a construction variation permits the bottom end 247 to terminate in a U-shaped snap fastener 249 as shown in FIG. 16. The U-shaped snap fastener 249 is designed to capture the axle 140 within a pair of jaws 250 formed on the fastener. Since the fastener is comprised of a generally resilient material, the jaws 250 can be positioned over and removed from the axle 140 with a modicum of force. The U-shaped snap fastener can be removed from the axle by employing a blunt instrument for separating the jaws 250. By employing the above described design variations in the preferred embodiment, the construction of the trash can caddy 100 remains essentially the same while the operation of the caddy is exactly the same;

From the foregoing, it will be appreciated that the trash can caddy 100 of the present invention substantially improves the efficiency of transporting various sized, covered plastic trash containers 112 while the closure lid 118 is intact by employing the spring-loaded hook assembly 102, and further significantly improves the stability of transporting such containers while seated in the stabilizing basket 114. Further, the caddy employs the upward facing plurality of fingers 120 of hook 119 for grasping the trash can container 112 from beneath the reinforced peripheral rim 116, permits the spring-loaded hook assembly 102 to be secured at a selected location along the main caddy shaft 108, includes the disassembling feature for permitting display, shipping, storage, and transportation of the caddy, and can be economically produced for domestic use by utilizing various high-strength plastics.

While a particular form of the invention has been illustrated and described, it will be apparent that various modifications can be made without departing from the spirit and scope of the invention. Accordingly, it is not intended that the invention be limited, except as by the appended claims.

I claim:

1. A container transporting apparatus comprising, in combination:
    a main shaft for providing structural support to said container transporting apparatus, said main shaft being comprised of a plurality of interlocking sections;
    means for assembling a hook to said main shaft comprising a housing and a member surrounding said main shaft, said hook being integral with said member surrounding said main shaft and mounted within said housing, said hook having a plurality of upwardly extending fingers and being spring-loaded within said housing by a spring surrounding said main shaft for providing vertical movement to said hook along said main shaft and for attaching to a container;
    means for adjusting said housing of said assembling means along said main shaft, said housing being adjustably locked to said main shaft and said spring-loaded hook being vertically moveable within said locked housing;
    means for supporting said container, said supporting means surrounding said main shaft and in mechanical communication with said housing of said assembling means;
    means for cradling said container, said cradling means in communication with and releasable from a bottom end of said main shaft for stabilizing said container within said transporting apparatus, said cradling means including a baseplate for contacting a bottom surface of said container; and
    means for moving said cradling means, said moving means for providing mobility to said transporting apparatus.

2. The apparatus of claim 1 wherein said main shaft is formed from an I-beam.

3. The apparatus of claim 1 wherein said main shaft is comprised of plastic.

4. The apparatus of claim 1 wherein said plurality of interlocking sections of said main shaft are locked together by a plurality of rigid snap fasteners.

5. The apparatus of claim 1 wherein said housing of said assembling means includes a vertical slot wherein said spring-loaded hook and a hook handle extend through opposite sides of said slot.

6. The apparatus of claim 1 wherein said hook comprises a hook handle connected to said member surrounding said main shaft and wherein said plurality of upwardly extending fingers includes a concave space located between each of said fingers, said plurality of fingers being arcuate for attaching beneath a peripheral rim of said container when said hook handle is operated.

7. The apparatus of claim 1 wherein said supporting means is integrally connected to said housing.

8. The apparatus of claim 1 wherein said supporting means is integrally molded to said housing.

9. The apparatus of claim 1 wherein in said housing comprises a pair of housing portions having a top end and a bottom end, said top end of each of said housing portions including an end cover for closing a void located between each of said housing portions and said main shaft.

10. The apparatus of claim 1 wherein said housing comprises a pair of housing portions having a plurality of mechanical connectors for joining said housing portions.

11. A container transporting apparatus comprising, in combination:
 a main shaft for providing structural support to said container transporting apparatus, said main shaft being comprised of a plurality of interlocking sections;
 a hook assembly mounted on said main shaft comprising a hook, said hook being integral with a member surrounding said main shaft and mounted within a housing, said hook having a plurality of upwardly extending fingers and being spring-loaded within said housing by a spring surrounding said main shaft for providing vertical movement to said hook along said main shaft and for attaching to a container;
 a level adjustment lock secured to said hook assembly for adjustably locking said housing to said main shaft and said spring-loaded hook being vertically movable within said locked housing;
 an upper support bracket surrounding said main shaft and in mechanical communication with said hook housing for providing support while transporting said container;
 a basket in communication with and releasable from a bottom end of said main shaft for cradling and stabilizing said container, said basket including a baseplate for contacting a bottom surface of said container; and
 a plurality of wheels mounted to said basket for providing mobility to said container transporting apparatus.

12. The apparatus of claim 11 wherein said level adjustment lock further includes a lock nut for locking said hook assembly to said main shaft.

13. The apparatus of claim 12 wherein said lock nut includes a threaded interior terminating in a conically shaped receptacle.

14. The apparatus of claim 11 wherein said hook housing further includes a segmented sleeve having a plurality of threads mounted on an external surface of said segmented sleeve for mating with a lock nut of said level adjustment lock, said segmented sleeve having a conical shaped terminal end adjacent to said plurality of threads for mating with a conically shaped receptacle of said lock nuts.

15. The apparatus of claim 11 wherein said level adjustment lock further includes a cosmetic cap secured within a rim formed in a lock nut, said cap being separate from said lock nut and being provided for closing a void located between said hook housing and said main shaft.

16. The apparatus of claim 11 wherein in said upper support bracket is integrally molded to said hook housing.

17. The apparatus of claim 11 further including a spring cavity located within said upper support bracket, said bracket for housing said spring surrounding said main shaft, said spring for biasing said member surrounding said main shaft and integral with said hook.

18. The apparatus of claim 17 wherein said spring cavity comprises a ledge for supporting said spring.

19. The apparatus of claim 11 wherein said spring-loaded hook includes said member surrounding said main shaft and integral with said hook, said member being a cylindrical skirt mounted above said spring, said spring for providing an upward biasing force against said cylindrical skirt.

20. The apparatus of claim 11 wherein said basket further includes a penetration for receiving the bottom end of said main shaft, said bottom end of said main shaft comprising a releasable snap fastener for capturing an axle passing through said basket.

21. The apparatus of claim 11 wherein said basket further comprises a toe stop formed on a rearward side of said basket and below an axle for assisting in rotating said transporting apparatus about said axle connected to said plurality of wheels.

22. The apparatus of claim 4 wherein said baseplate includes a concave shaped portion formed at a front end of said baseplate for interfacing with a bottom surface of said container.

23. The apparatus of claim 11 wherein said spring-loaded hook comprises a hook handle connected to said member surrounding said main shaft and wherein said plurality of upwardly extending fingers includes a concave shaped space located between each of said fingers, said plurality of fingers being radiused for attaching beneath a peripheral rim of said container when said hook handle is operated.

24. The apparatus of claim 11 wherein said upper support bracket is integrally connected to said housing.

25. The apparatus of claim 11 wherein said upper support bracket is integrally molded to said housing.

26. The apparatus of claim 11 wherein said housing comprises a pair of housing portions having a top end and a bottom end, said top end of each of said housing portions including an end cover for closing a void located between each of said housing portions and said main shaft.

27. The apparatus of claim 11 wherein said housing comprises a pair of housing portions having a plurality of mechanical connectors for joining said housing portions.

28. A container transporting apparatus comprising, in combination:
 a main shaft for providing structural support to said container transporting apparatus;

means for assembling a hook to said main shaft, comprising a housing and a member surrounding said main shaft, said hook being integral with said member surrounding said main shaft and mounted within said housing, said hook having a plurality of upwardly extending fingers and being spring-loaded within said housing by a spring surrounding said main shaft for providing vertical movement to said hook along said main shaft and for attaching to a container;

means for adjusting said housing of said assembling means along said main shaft, said housing being adjustably locked to said main shaft and said spring-loaded hook being vertically movable within said locked housing;

means for supporting said container, said supporting means surrounding said main shaft and in mechanical communication with said housing of said assembling means;

means for cradling said container, said cradling means in communication with and releasable from a bottom end of said main shaft for stabilizing said container within said transporting apparatus, said cradling means including a baseplate for contacting a bottom surface of said container; and means for moving said cradling means, said moving means for providing mobility to said transporting apparatus.

29. A container transporting apparatus comprising, in combination:

a main shaft for providing structural support to said container transporting apparatus;

a hook assembly mounted on said main shaft comprising a hook, said hook being integral with a member surrounding said main shaft and mounted within a housing, said hook having a plurality of upwardly extending fingers and being spring-loaded within said housing by a spring surrounding said main shaft for providing vertical movement to said hook along said main shaft and for attaching to a container;

a level adjustment lock secured to said hook assembly for adjustably locking said housing to said main shaft and said spring loaded hook being vertically movable within said locked housing;

an upper support bracket surrounding said main shaft and in mechanical communication with said hook housing for providing support while transporting said container;

a basket in communication with and releasable from a bottom end of said main shaft for cradling and stabilizing said container, said basket including a baseplate for contacting a bottom surface of said container; and a plurality of wheels mounted to said basket for providing mobility to said container transporting apparatus.

* * * * *